(12) United States Patent
Liu et al.

(10) Patent No.: US 11,685,862 B1
(45) Date of Patent: Jun. 27, 2023

(54) SPECIAL SOIL CONDITIONER FOR SODA SALINE-ALKALINE PADDY FIELDS AND PREPARATION METHOD THEREOF

(71) Applicant: Northeast Institute of Geography and Agroecology, Chinese Academy of Sciences, Changchun (CN)

(72) Inventors: Hongyuan Liu, Changchun (CN); Bolong Wen, Changchun (CN); Guoshuang Chen, Changchun (CN)

(73) Assignee: Northeast Institute of Geography and Agroecology, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/107,630

(22) Filed: Feb. 9, 2023

(30) Foreign Application Priority Data

Apr. 22, 2022 (CN) .......................... 202210427665.5

(51) Int. Cl.
  *C09K 17/40* (2006.01)
(52) U.S. Cl.
  CPC .................................... *C09K 17/40* (2013.01)
(58) Field of Classification Search
  CPC .......................... C09K 17/40; C09K 2101/00
  See application file for complete search history.

(56) References Cited

FOREIGN PATENT DOCUMENTS

| CN | 101157587 A | 4/2008 |
|---|---|---|
| CN | 101962555 A | 2/2011 |
| CN | 104293355 A | 1/2015 |
| CN | 106396916 A | 2/2017 |
| CN | 108300485 A | 7/2018 |
| CN | 110437844 A | 11/2019 |
| CN | 113287385 A | 8/2021 |
| CN | 113396915 A | 9/2021 |

OTHER PUBLICATIONS

Author's name: Lin Qimei, Publication date: Jun. 1996, Title: Soil and fertilizer science Publication name: Soil and fertilizer science, Date: Jun. 1996.
Author's name: Wang Sangen, Publication date: Aug. 2003 Title: Application of plant growth regulators in flower production Publication name: Application of plant growth regulators in flower production Date: Aug. 2003.
Jin Meng-ye, Huang Juan, Hou Pin, et al. Improvement effect of three environmental materials and their composite application on saline-alkali soil[J]. Journal of Agro-Environment Science, 2020, 39 (1) : 118-124.

*Primary Examiner* — Carib A Oquendo
(74) *Attorney, Agent, or Firm* — Stuart H. Mayer; Mayer & Williams PC

(57) ABSTRACT

Disclosed is a special soil conditioner for soda saline-alkaline paddy fields and a preparation method thereof, relating to the technical field of soil conditioner preparation. The raw materials of the soil conditioner include calcium chloride dihydrate, anionic polyacrylamide, mineral potassium fulvate, diethylaminoethyl (DA) polyamine, DA-7 or DA-8, brassinolide, potassium indolebutyrate, sodium α-naphthylacetate and powder anti-caking agent. The above components are mixed according to a specific weight ratio to obtain the special soil conditioner for soda saline-alkaline paddy fields.

2 Claims, 2 Drawing Sheets

SPECIAL SOIL CONDITIONER FOR SODA SALINE-ALKALINE PADDY FIELDS AND PREPARATION METHOD THEREOF

CROSS-REFERENCE TO RELATED APPLICATIONS

This application claims priority to Chinese Patent Application No. 202210427665.5, filed on Apr. 22, 2022, the contents of which are hereby incorporated by reference.

TECHNICAL FIELD

The present application relates to the technical field of preparation of soil conditioners, and in particular to a special soil conditioner for soda saline-alkaline paddy fields and preparation method thereof.

BACKGROUND

Because of poor soil fertility and difficult improvement, soda saline-alkaline land is recognized as a typical marginal land with low yields. However, once the land is utilized efficiently, the land will have high potential for increasing production.

Based on the basic principle of "salt comes with water and salt goes with water", developing paddy fields to grow rice is an effective way to utilize the soda saline-alkaline land. However, even if irrigation and drainage measures are taken to reduce exchangeable sodium percentage (ESP) before transplanting, rice seedlings grow weak or even wither and die due to saline-alkaline stress in the land with high ESP. Applying soil conditioner can speed up the reduction of soil alkalinity and ESP, improve soil structure, improve the efficiency of salt washing and alkaline reduction, and reduce the saline-alkaline stress of rice as a result, is the most important technical measure of improving soil for rice planting in soda saline-alkaline land.

In view of the key obstacle characteristics of soda saline-alkaline soil, such as strong alkalinity, high ESP and poor structure, scientific and technical personnel have developed calcium source, acidic and organic conditioners, which have obvious soil improvement effect and greatly increased rice yield, but there are still big problems. The growth and yield of rice are determined by the comprehensive action of soil-water-rice, but the existing soil conditioners usually only focus on soil improvement, which indirectly reduces the saline-alkaline stress of water layer and promotes the growth and development of rice by improving the soil properties of the whole topsoil with a thickness of 15-20 cm, while the direct regulation of water and rice is ignored. In fact, the topsoil per hectare of land exceeds 2000 t (ton), so a single conditioner for soil improvement is required to be applied in large quantities. The existing saline-alkaline soil conditioner generally needs to be applied several tons to tens of tons per hectare, which leads to high cost and heavy field workload. These problems greatly restrict the application and popularization of soil conditioner and the utilization of land in rice planting in soda saline-alkaline land. Therefore, it is urgent to develop an efficient, low-cost and easy-to-apply soil conditioner for the soil-water-rice complex.

SUMMARY

The objective of the present application is to provide a special soil conditioner for soda saline-alkaline paddy fields and preparation method thereof, so as to solve the problems existing in the above-mentioned prior art, reduce obstacles and improve functions of soil-water-rice complex, and achieve remarkable yield increase.

To achieve the above objective, the present application provides the following scheme.

The present application provides the special soil conditioner for soda saline-alkaline paddy fields, and raw materials include following components in parts by weight: 560-740 parts of calcium chloride dihydrate, 45-90 parts of anionic polyacrylamide, 45-90 parts of mineral potassium fulvate, 1.8-2.7 parts of diethylaminoethyl (DA) polyamine, DA-7 or DA-8, 0.6-0.9 parts of brassinolide, 0.6-0.8 parts of potassium indolebutyrate, 0.3-0.4 parts of sodium α-naphthylacetate and 5-8 parts of powder anti-caking agent.

Optionally, the calcium chloride dihydrate is powder and calcium chloride content is ≥74 wt % (weight percentage).

Water-soluble calcium ions provided by the calcium chloride dihydrate react with alkaline-causing bicarbonate and carbonate ions of water layer in the paddy fields to form calcium carbonate precipitate, thus rapidly reducing the alkalinity of the water layer in the paddy fields; water-soluble calcium ions replace exchangeable sodium ions adsorbed by soil colloid through cation exchange reaction, thus reducing the exchangeable sodium percentage (ESP) of topsoil and promoting flocculation and sedimentation. The more alkaline soil and irrigation water are, the more parts by weight of the calcium chloride dihydrate are. From the aspect of action effect, anhydrous calcium chloride, anhydrous calcium nitrate and calcium nitrate tetrahydrate may be used instead of the calcium chloride dihydrate, but the effect of unit weight of these three components is less than that of the calcium chloride dihydrate and the price cost is obviously higher than that of the calcium chloride dihydrate, so the present application finally selects the calcium chloride dihydrate.

Optionally, a molecular weight of the anionic polyacrylamide is 6-12 Mg/mol (milligrams per mole).

The anionic polyacrylamide is a water-soluble polymer with negative charge and good physical adsorption capacity. The anionic polyacrylamide promotes flocculation and sedimentation, and makes soil particles cement together, thus achieving the effect of rapidly layering slurry and improving soil structure. The finer the soil texture, the smaller the selected molecular weight and the fewer parts by weight.

The combination of the anionic polyacrylamide and the above-mentioned calcium chloride dihydrate effectively realizes the flocculation and sedimentation of soda saline-alkaline soil with strong dispersion, improves the soil structure, and reduces the alkalinity and the ESP of water layer and topsoil layer. In addition, the slurry layering is fast and the water layer is clear, which is conducive to sunlight transmission, so the ground temperature is indirectly promoted to be increased and cold damage in spring is prevented and the growth of rice seedlings is promoted.

Optionally, a potassium oxide content is ≥12 wt %, a humic acid content is ≥60 wt % and a fulvic acid content is ≥50 wt % in the mineral potassium fulvate.

The mineral potassium fulvate increases soil organic matter, regulates soil salinity, improves fertilizer utilization rate, and enhances crop resistance. Although the mineral potassium fulvate has no obvious effect of unilaterally improving soil or promoting rice growth, it has a comprehensive effect. As a substance coordinator to be adopted, the mineral potassium fulvate coordinates the soil improvement component, water improvement component and the following rice regulation component in the present application to play a role comprehensively.

Optionally, content of active ingredient of the DA polyamine or the DA-7 or the DA-8 is ≥98 wt %; content of active ingredient of the brassinolide is 0.01 wt %.

The DA polyamine or the DA-7 or the DA-8 indirectly enhances the photosynthetic rate, cold resistance and stress resistance of plants by regulating the balance of endogenous hormones in plants. The indirect regulation of the DA polyamine or the DA-7 or the DA-8 takes effect slowly and has a mild effect, but the DA polyamine or the DA-7 or the DA-8 are absorbed by plants and stored in the plants and has a long-lasting effect of up to 30 days. As an endogenous hormone of plants, the brassinolide directly acts on crops, promotes cell division and plant growth. The brassinolide takes effect rapidly but lasts short-time effect, generally only 10-14 days. In addition, the efficacy of brassinolide changes greatly with temperature fluctuation and it is for the brassinolide to cause harm due to increased temperatures, so it is advisable to use the brassinolide in a reduced amount.

The combination of the DA polyamine or the DA-7 or the DA-8 with the brassinolide promotes the growth of rice plants, takes effect rapidly and is effective for a long time on the growth of rice turning green, and reduces the dosage of the brassinolide, effectively avoiding the risk of harm of the brassinolide.

Optionally, content of active ingredient of potassium indolebutyrate is ≥98 wt %; content of active ingredient of the sodium α-naphthylacetate is ≥98 wt %.

Both potassium indolebutyrate and sodium α-naphthylacetate promote root cell division, thus speeding up rooting and taking root of transplanted rice seedlings, but the potassium indolebutyrate mainly promotes capillary root formation and the sodium α-naphthylacetate mainly promotes taproot formation. Although rice belongs to fibrous root plant, a root system thereof is mainly composed of lateral roots, practice shows that the combination of the potassium indolebutyrate and the sodium α-naphthylacetate at the ratio of 2:1 has the best effect on promoting rooting and taking root of the transplanted rice seedlings.

Optionally, the purity of the powder anti-caking agent is ≥98%, and the powder anti-caking agent is used to prevent caking. There are many mature common products in the market, and the existing conventional products may be used. The powder anti-caking agent used in the embodiment of the application is purchased from Shijiazhuang Beiernuo Agricultural Science and Technology Co., Ltd., and the product name is "High-efficiency anti-caking agent".

The present application also provides a preparation method of the above-mentioned special soil conditioner for soda-saline paddy fields, including the following steps:

proportioning and mixing the raw materials in parts by weight to obtain the special soil conditioner for soda saline-alkaline paddy fields.

The special soil conditioner for soda saline-alkaline paddy field of the present application is applied after transplanting rice seedlings, and the application mode is sprinkling or flushing, and direct spray on the surface of crops is not accepted.

The present application discloses the following technical effects.

The application targets the soil-water-rice complex, aiming at the key sensitive period of rice transplanting turning green, and through the effects of ion exchange, physical adsorption, chemical fixation, etc., reduces the alkalinity of water layer and topsoil layer, promotes the flocculation of water layer slurry, and improves the permeability of topsoil, thereby reducing the saline-alkaline stress of soil-water on rice seedlings. By activating cells and improving stress resistance, the growth potential of rice seedlings is greatly improved, and the turning green is promoted and tillers are strengthened. The function of soil-water-rice complex is improved, and the yield increase effect is obvious. The yield after applying the conditioner of the present application in the same year is 5127-6420 kg/hm$^2$. The application amount of the soil conditioner in this application is small, only 66-93 kg/hm$^2$, with low costs and small field workloads.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings may be obtained according to these drawings without any creative effort.

DETAILED DESCRIPTION OF THE EMBODIMENTS

Figure 1:
FIG. 1 is a comparison of flocculation promoting effects between a control treatment group and an experimental treatment group in embodiment 1 of the present application.

Various exemplary embodiments of the present application will now be described in detail. This detailed description should not be taken as a limitation of the present application, but should be understood as a more detailed description of some aspects, characteristics and embodiments of the present application.

It should be understood that the terms described in the present application are only used to describe specific embodiments, and are not used to limit the present application. In addition, for the numerical range in the present application, it should be understood that each intermediate value between the upper limit and the lower limit of the range is also specifically disclosed. Every smaller range between any stated value or the intermediate value within the stated range and any other stated value or the intermediate value within the stated range is also included in the present application. The upper and lower limits of these smaller ranges may be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein may be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many improvements and changes may be made to the specific embodiments of the present specification. Other embodiments obtained from the description of the present application will be obvious to the skilled person. The specification and embodiment of this application are only exemplary.

As used in this text, "including", "having", "comprising" and so on are all open terms, which means including but not limited to.

The "parts" mentioned in the present application are in parts by weight unless otherwise specified.

Calcium chloride dihydrate used in the embodiments of the present application is powder and calcium chloride content is ≥74 wt %; purity of powder high-efficiency anti-caking agent is ≥98%.

Content of active ingredient of DA polyamine, DA-7 and DA-8 used is ≥98 wt %, content of active ingredient of brassinolide is 0.01 wt %, content of active ingredient of potassium indolebutyrate is ≥98 wt % and content of active ingredient of sodium α-naphthylacetate is ≥98 wt %.

Embodiment 1

A special soil conditioner for soda saline-alkaline paddy fields is prepared from following raw materials in parts by weight:

700 parts of the calcium chloride dihydrate, 85 parts of anionic polyacrylamide (molecular weight 12 Mg/mol) and 60 parts of mineral potassium fulvate, 2.1 parts of DA-7, 0.7 parts of the brassinolide, 0.6 parts of the potassium indolebutyrate, 0.3 parts of sodium α-naphthylacetate and 7 parts of powder high-efficiency anti-caking agent.

The special soil conditioner for soda saline-alkaline paddy fields is prepared is as follows:

(1) accurately weighing the raw material components:
(2) adding the powder high-efficiency anti-caking agent, the DA-7, the brassinolide, the potassium indolebutyrate, the sodium α-naphthylacetate and the mineral potassium fulvate into a stirrer and stirring until uniform; and
(3) continuing to add the anionic polyacrylamide and the calcium chloride dihydrate into the stirrer, and stirring until uniform.

The experimental soda saline-alkaline paddy field is located in Dagangzi Town, Daan City, Baicheng City, Jilin Province. The experimental soda saline-alkaline paddy field is newly-reclaimed, with 20 cm of topsoil with a pH of 10.63, electrical conductivity of 1076 μS/cm, and ESP of 41.13%. After raking the land in spring, 85 kg/hm² of the soil conditioner of this embodiment is applied as an experimental treatment group. Compared with a control treatment group without soil conditioner, the slurry layering effect of water layer slurry of the experimental treatment group is remarkable, and content of alkaline-causing bicarbonate ion in water layer is 103 mg/L (milligrams per liter) lower than that of the control treatment group.

FIG. 1 is a comparison of the flocculation promoting effect between the control treatment group and the experimental treatment group in embodiment 1, which is used to verify and demonstrate the flocculation and sedimentation promoting effect of the present application on dispersive slurry in soda saline-alkaline paddy field. In the figure, the left pond is the control treatment, and the right pond is the experimental treatment. It is easy to see that the control treatment does not layer slurry for a long time, and the water layer is in the form of suspended slurry. The experimental treatment rapidly layers slurry and the water layer is clear.

Embodiment 2

A special soil conditioner for soda saline-alkaline paddy fields is prepared from following raw materials in parts by weight:

740 parts of the calcium chloride dihydrate, 90 parts of anionic polyacrylamide (molecular weight 10 Mg/mol) and 90 parts of the mineral potassium fulvate, 2.5 parts of the DA polyamine, 0.8 part of the brassinolide, 0.8 part of potassium indolebutyrate, 0.4 part of the sodium α-naphthylacetate, and 8 parts of powder high-efficiency anti-caking agent.

The special soil conditioner for soda saline-alkaline paddy fields is prepared as follows:

(1) accurately weighing the raw material components;
(2) adding the powder high-efficiency anti-caking agent, the DA polyamine, the brassinolide, the potassium indolebutyrate, the sodium α-naphthylacetate into a stirrer and the mineral potassium fulvate, and stirring until uniform; and
(3) continuing to add the anionic polyacrylamide and the calcium chloride dihydrate into the stirrer, and stirring uniform.

The experimental soda saline-alkaline paddy field is located in Dagangzi Town, Daan City, Baicheng City, Jilin Province and is newly-reclaimed, with 20 cm of topsoil with a pH of 10.57, the conductivity is 1048 μS/cm, and the ESP is 40.51%. On the second day after transplanting in spring, 93 kg/hm² of the soil conditioner of this embodiment is applied as an experimental treatment group, while no soil conditioner is applied as a control treatment group. The content of alkaline-causing bicarbonate ion in water layer of experimental treatment is 112 mg/L lower than that of control treatment. Other management measures of the two groups are the same, and the yield in autumn is 402 kg/hm² (kilograms per square hectare) in the control treatment group and 5127 kg/hm² in the experimental treatment group.

Figure 2:
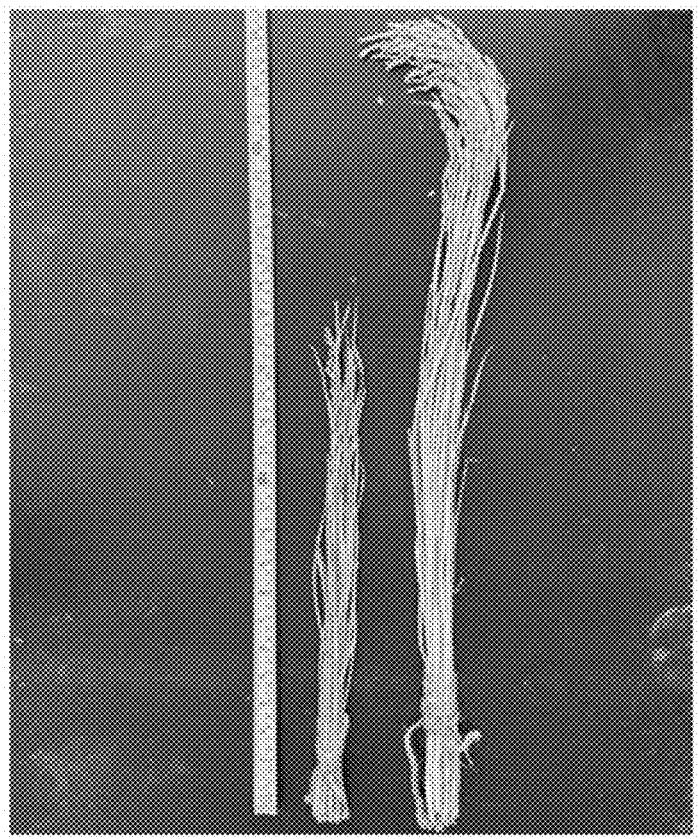
FIG. 2 is a comparison of aboveground parts of rice between a control treatment group and an experimental treatment group in autumn in embodiment 2 of the present application.

FIG. 2 is a comparison of aboveground parts of rice between the control treatment group and the experimental treatment group in autumn in embodiment 2. The aboveground parts of rice in the control treatment was yellow and brownish, plants are short, tillers are weak and few, and grains are dry and not full, while the aboveground parts of rice in the experiment treatment group is yellow, plants are tall, tillers are strong and more, and grains are full and more per spike.

Embodiment 3

A special soil conditioner for soda saline-alkaline paddy fields is prepared from following raw materials in parts by weight:

650 parts of calcium chloride dihydrate, 75 parts of anionic polyacrylamide (molecular weight 10 Mg/mol), 80 parts of mineral potassium fulvate, 2.3 parts of DA polyamine, 0.8 parts of brassinolide, 0.8 parts of potassium indolebutyrate, 0.4 parts of sodium α-naphthylacetate and 7 parts of powder high-efficiency anti-caking agent.

The special soil conditioner for soda saline-alkaline paddy fields is prepared is as follows:

(1) accurately weighing the raw material components:
(2) adding the powder high-efficiency anti-caking agent, the DA polyamine, the brassinolide, the potassium indolebutyrate, the sodium α-naphthylacetate and mineral potassium fulvate into a stirrer, and stirring until uniform; and
(3) continuing to add the anionic polyacrylamide and the calcium chloride dihydrate into the stirrer, and stirring until uniform.

The experimental soda saline-alkaline paddy field is in Dagangzi Town, Daan City, Baicheng City, Jilin Province and is a second-year paddy field, with 20 cm of topsoil with a pH of 10.43, the electrical conductivity of 957 μS/cm, and the ESP of 36.54%. On the second day after transplanting in spring, 81 kg/hm² soil conditioner of this embodiment is applied as an experimental treatment group, and no soil conditioner is applied as a control treatment group. The content of alkaline-causing bicarbonate ion in water layer of experimental treatment is 126 mg/L lower than that of control treatment. Other management measures of the two groups are the same, and the yield in autumn is 2042 kg/hm² in the control treatment group and 6420 kg/hm² in the experimental treatment group.

Embodiment 4

A special soil conditioner for soda saline-alkaline paddy fields is prepared from following raw materials in parts by weight:

650 parts of calcium chloride dihydrate, 66 parts of anionic polyacrylamide (molecular weight 10 Mg/mol) and 62 parts of mineral potassium fulvate, 2.3 parts of DA polyamine, 0.8 part of brassinolide, 0.8 part of potassium indolebutyrate, 0.4 part of sodium α-naphthylacetate, 46 parts of zinc citrate chelate (zinc content ≥20%), 35 parts of magnesium trisilicate (active ingredient content ≥98%), 35 parts of potassium silicate (active ingredient content ≥98%), 1.5 parts of EM (Effective Microorganism) strain (dry powder) and 7 parts of powder high-efficiency anti-caking agent.

The special soil conditioner for soda saline-alkaline paddy fields is prepared is as follows:

(1) accurately weighing the raw material components:

(2) adding the powder high-efficiency anti-caking agent, the DA polyamine, the brassinolide, the potassium indolebutyrate and sodium α-naphthylacetate, and the mineral potassium fulvate into a stirrer, and stirring until uniform;

(3) continuing to add the EM strain, the magnesium trisilicate, the potassium silicate and the zinc citrate chelate into the stirrer, and stirring until uniform; and (4) continuing to add the anionic polyacrylamide and the calcium chloride dihydrate into the stirrer, and stirring uniform.

The experimental soda saline-alkaline paddy field is located in Dagangzi Town, Daan City, Baicheng City, Jilin Province and is the second-year paddy field, with 20 cm of topsoil with a pH of 10.43, the conductivity of 957 μS/cm, and the ESP of 36.54%. On the second day after transplanting in spring, 90 kg/hm² of the soil conditioner of this embodiment is applied, and the content of alkaline-causing bicarbonate ion in water layer is decreased by 122 mg/L compared with that before application, and the yield in autumn is 6514 kg/hm².

The soda saline-alkaline rice soil has low nutrient limitation due to strong alkalinity. Rice seedlings are prone to red rot due to zinc and silicon deficiency in the early stage of transplanting. Supplementing zinc and silicon fertilizer prevents this type of red rot. At the same time, the silicon fertilizer is a combination of slow-acting magnesium trisilicate and quick-acting potassium silicate in a ratio of 1:1, which not only achieves quick and long-acting silicon fertilizer supplement, but also supplements trace element magnesium and a large amount of potassium. The EM strain improves soil microbial activity, and is beneficial to improve soil properties and stress resistance of rice. Generally speaking, adding the zinc citrate chelate, the magnesium trisilicate, the potassium silicate and the EM strain improves the effect of the application.

Comparative Embodiment 1

The difference from embodiment 2 is that the potassium indolebutyrate is adjusted to 1 part.

The experimental soda saline-alkaline paddy field is located in Dagangzi Town, Daan City, Baicheng City, Jilin Province and is a newly-reclaimed paddy field with 20 cm of topsoil with a pH of 10.57, electrical conductivity of 1048 μS/cm, and the ESP of 40.51%. On the second day after transplanting in spring, 93 kg/hm² of the soil conditioner of this embodiment is applied, and the content of alkaline-causing bicarbonate ion in water layer is decreased by 112 mg/L compared with that before application, and the yield in autumn is 4943 kg/hm².

The above-mentioned embodiments only describe the preferred mode of the present application, but do not limit the scope of the present application. On the premise of not departing from the design spirit of the present application, all kinds of modifications and improvements made by ordinary technicians in the field to the technical scheme of the present application shall fall within the scope of protection determined by the claims of the present application.

What is claimed is:

1. A special soil conditioner for soda saline-alkaline paddy fields, comprising raw material components in parts by weight:
    560-740 parts of calcium chloride dihydrate, 45-90 parts of anionic polyacrylamide, 45-90 parts of mineral potassium fulvate, 1.8-2.7 parts of diethylaminoethyl (DA) polyamine, DA-7 or DA-8, 0.6-0.9 parts of brassinolide, 0.6-0.8 parts of potassium indolebutyrate, 0.3-0.4 parts of sodium α-naphthylacetate and 5-8 parts of powder anti-caking agent,
    wherein the potassium indolebutyrate and the sodium α-naphthylacetate are compounded in a ratio of 2:1;
    wherein a calcium chloride content in the calcium chloride dihydrate is ≥74 wt %;
    wherein a molecular weight of the anionic polyacrylamide is 6-12 Mg/mol;
    wherein a potassium oxide content is ≥12 wt %, a humic acid content is ≥60 wt % and a fulvic acid content is ≥50 wt % in the mineral potassium fulvate;
    wherein a content of an active ingredient of the DA polyamine or the DA-7 or the DA-8 is ≥98 wt %;
    wherein a content of an active ingredient of the brassinolide is 0.01 wt %, a content of an active ingredient of the potassium indolebutyrate is ≥98 wt %, and a content of an active ingredient of the sodium α-naphthylacetate is ≥98 wt %.

2. A preparation method of the special soil conditioner for soda saline-alkaline paddy fields according to claim 1, comprising a following step:
    mixing the raw materials according to parts by weight to obtain the special soil conditioner for soda saline-alkaline paddy fields.

* * * * *